(12) United States Patent
Jönsson

(10) Patent No.: US 8,388,783 B2
(45) Date of Patent: Mar. 5, 2013

(54) METHOD FOR PRODUCING AN IMPROVED HULL

(75) Inventor: Sven Jönsson, Dalarö (SE)

(73) Assignee: Fagerdala Marine Systems AB, Oregrund (SE)

(*) Notice: Subject to any disclaimer, the term of this patent is extended or adjusted under 35 U.S.C. 154(b) by 361 days.

(21) Appl. No.: 12/918,671

(22) PCT Filed: Feb. 20, 2009

(86) PCT No.: PCT/SE2009/000099
§ 371 (c)(1),
(2), (4) Date: Oct. 22, 2010

(87) PCT Pub. No.: WO2009/105010
PCT Pub. Date: Aug. 27, 2009

(65) Prior Publication Data
US 2011/0024026 A1    Feb. 3, 2011

(30) Foreign Application Priority Data

Feb. 22, 2008 (WO) ................. PCT/SE2008/000151

(51) Int. Cl.
*B32B 37/00* (2006.01)

(52) U.S. Cl. ............ 156/87; 156/92; 156/154; 156/297; 156/299

(58) Field of Classification Search .................... 156/91, 156/92, 154, 297, 299, 252, 87, 256, 331.4
See application file for complete search history.

(56) References Cited

U.S. PATENT DOCUMENTS 5,508,111 A  4/1996  Schmucker 6,187,892 B1  2/2001  Markusch et al.
2007/0266924 A1  11/2007  Jonsson

FOREIGN PATENT DOCUMENTS

| EP | 0 044 286 A2 | 1/1982 |
|---|---|---|
| EP | 0 358 510 A2 | 3/1990 |
| EP | 0 389 456 A2 | 9/1990 |
| EP | 0 438 725 A2 | 7/1991 |
| EP | 0673763 A1 * | 9/1995 |
| GB | 2 000 725 A | 1/1979 |
| JP | 7-62322 A | 3/1995 |
| WO | 90/09309 | 8/1990 |

OTHER PUBLICATIONS

International Search Report for corresponding International Application No. PCT/SE2009/000099 mailed Apr. 29, 2009.

* cited by examiner

*Primary Examiner* — Jeff Aftergut

(74) *Attorney, Agent, or Firm* — Renner, Otto, Boisselle & Sklar, LLP

(57) ABSTRACT

The present invention relates to a method for manufacturing a hull for vessels, containers or equivalents. The method comprises the steps: preparing an elastic or viscoelastic glue through mixing of at least two components; monitoring and/or controlling the mixing for determining if a correct desired mixing product has been achieved; applying a layer of the glue onto the hull (2) or on a first side of a sheet (4) of cellular plastic or other light weight material; mounting the sheet onto the hull, the sheet being equipped with a multiplicity of through-going air evacuation holes (12); placing an air permeable material (6) on top of the other side of the sheet (4), mounting a vacuum foil (8) onto the other side of the sheet; gluing by vacuum suction; observing visually if the glue exits out of the air evacuation holes on the other side of the sheet.

15 Claims, 2 Drawing Sheets

A - A

METHOD FOR PRODUCING AN IMPROVED HULL

This application is a national phase of International Application No. PCT/SE2009/000099 filed Feb. 20, 2009 and published in the English language, which claims priority to International Application No. PCT/SE2008/000151 filed Feb. 22, 2008.

FIELD OF THE INVENTION

The present invention relates to a method of manufacturing of an improved hull for vessels, constructions, containers, tanks or equivalents.

BACKGROUND

EP-B1-0473587 concerns a method for manufacturing of an improved hull, primarily for ships and boats, in particular with regards to surface finish, heat insulation and acoustic absorption. According to this known method sheets of cellular plastic is glued on to the outer surface of the hull.

In mounting of the sheets of cellular plastic or other light weight material on the hull the quality of the glue joint is of the highest importance to ensure the hull systems function in long term use, which could be 30-50 years. On a surface on the inner hull of for example metal, plastic or concrete, or alternatively directly on the sheets according to a preferred method, a film of elastic or viscoelastic glue is first applied, which is evened out to an evenly distributed layer.

In mounting of the sheets of cellular plastic or other light weight material it is necessary to create an even vacuum over the sheets for evacuation of the air from the glue joint between the hull and the sheets for eliminating the presence of air pockets. The problem has been to achieve a glue joint that is guaranteed to be free from air pockets, which otherwise creates uncertainty of the quality and strength of the construction during the many years of use. In conventional vacuum gluing for example a sheet and an intermediate glue layer is pressed against another surface, through that an impermeable foil with one or more vacuum valves is placed over the sheet and is taped up in the sides, whereafter a negative pressure is brought on. Thereby the foil and the sheet is sucked/pressed against the surface to which the sheet shall be glued with a pressure of up to 1 Kg/cm$^2$. However it has been shown that air pockets can arise in the glue joint in such conventional vacuum gluing, especially if the surface is uneven. For making the manufacturing process and the assembly work run efficiently it is preferable that control and monitoring of the gluing step can be made visually. The problem is hence that in the gluing process, to as large extent as possible, eliminate the arising of air pockets and develop a method enabling, with visual control only, to determine that the glue between the two surfaces which should be glued fully fills the space and that the space thereby is entirely free from air pockets.

In particular it is a large problem to create good adherence when mounting of sheets of cellular plastic on to metal hulls, since the metal hull usually has a considerably more uneven surface in comparison to sandwich constructions in plastic, concrete etc.

SUMMARY OF THE INVENTION

A purpose of the present invention is to achieve a method for the manufacturing of an improved hull for vessels, containers or equivalents, which at least partly eliminates the disadvantages associated with the methods according to the state of the art. Furthermore, a purpose is to achieve a quality assured method and device for a hull, a cost efficient way and from a security point of view reliable method for mounting of sheets of cellular plastic or other light weight material on a hull. Yet another purpose is to achieve an even vacuum distribution and eliminate the presence of air pockets in the glue joint in mounting of sheets of cellular plastic or other light weight material.

These purposes and others are achieved through the method, for manufacturing an improved hull for vessels, containers or equivalents, in accordance with the present invention, comprising the following steps: preparation of an elastic or viscoelastic glue, through mixing of at least two components; monitoring and/or control of the mixing for deciding if a correct desired mixed product has been achieved; applying a layer of the correct mixture of the glue on the hull (2) or at a first side of a sheet (4) of cellular plastic or other light weight material; mounting of at least one sheet (4) against the hull (2), which sheet has a multiplicity of through-going evacuation holes (12) which ends at the first and a second side of the sheet (4), respectively; arranging a net, a web, a wire or equivalent air permeable material (6) on top of the other side of the sheet (4), wherein the air permeable material (6) is coated with a bonded release agent; fixation of the sheet (4) against adjacent sheets (4), wherein at least one fixation element is arranged over a joint between the sheets; mounting of a vacuum foil (8) against the other side of the sheet (4) for achieving a vacuum between the sheet and the hull (2) in gluing through vacuum suction; observing visually if the glue advances or not, out from the air evacuation holes on the other side of the sheet; enlarging of the joints between the sheets and refilling with putty compound or a strip of cellular plastic together with a bonding agent; and shaping/evening of the surface of the glued on sheets with abrasive tools.

This invention constitutes a solution which makes it possible to eliminate problems and disadvantages with the above mentioned background, concerning the insurance of the quality in performing the method and the quality of the finished construction. The method according to the present invention for example provides three important advantages since it reinforces, insulates and provides a desired surface finish, which is of major importance for hulls where it is decisive for the end customer that the appearance of the surface is attractive.

In the event of air being present in the glue layer between the sheet of cellular plastic and the surface, it is firstly evacuated when the negative pressure is applied, wherein the sheet of cellular plastic is adapted to the uneven surface of the hull, and as a control function that all the air is removed strings of glue will advance from the air evacuation holes. If some holes do not display strings of glue, this is a sign of that the glue has not adequately filled the glue joint, for example because of an uneven surface on to which the sheet of cellular plastic shall be glued, or because of a faulty glue distribution. Through this method a further advantage is achieved that the glue joint will be stronger, since the strings of glue advancing through the air evacuation holes, when they have hardened, will constitute an amount, from the glue surface in to the cellular plastic vertically extending mechanical fastening arms; with optional dimensioning according to the diameter of the holes and the thickness of the sheets of cellular plastic, according to the demands of strength of the glue construction. The method of the present invention has proven to be particularly suitable for the mounting of sheets of cellular plastic against metal hulls, since the method achieves good filling of large uneven parts of the surface, which often is the case on metal hulls. Since the sheet of cellular plastic is flexible, it can be adapted to the uneven parts of the hull when it is mounted against the hull in the applying of the negative pressure. Thus, the sheet of cellular plastic will flex and be pulled against the hull by the negative pressure. Full adherence can thereby be achieved if the uneven parts in the hull are not too deep or placed too close together for the hull to be evened out. According to one embodiment the sheet of cellular plastic is heated in a mobile heating oven on site, before the mounting against the hull, such that the sheet gets soft and flexible enough when it is to be applied against the hull.

It is possible to begin with one or multiple thin sheets of cellular plastic with little thickness, for example 10 mm, and/or low volume weight, if the surface is very uneven. Thereafter, the first layer of the sheet of cellular plastic can be grinded to a relatively even surface without considerably uneven portions, or considerably less uneven portions, before another following new second layer with sheets of cellular plastic is applied against the first layer. The advantage of using sheets of cellular plastic for leveling the uneven parts of the hull is that it creates a relatively small increase in weight. To in stead use putty compound as is conventionally used involves a considerable increase in weight.

The method according to the present invention can thus be performed more than one time for building multiple layers of sheets of cellular plastic, which preferably displays a thickness between 10 and 50 mm.

According to one embodiment the glue is preferably of a polyurethane base. The mixture usually comprises two components, such as preferably polyol and isocyanat. It is necessary to constantly being able to monitor that the desired mixture, such as a mixture of polyol and isocyanat, is the correct mixture. Both components can be pumped from respective drum with a preset amount per time unit and be continuously mixed in a mixing head. The resulting mixture is applied to the inner hull or sheet and is evened out to an even layer. The experience have thus shown that it from time to time happens that the ideal mixture can be interrupted, for example by the pumps not functioning correctly, or that the operator does not observe that a component is running empty. There is thereby a problem from a safety point of view and from a quality point of view, if a correct mixture of the glue components cannot be assured. According to a preferred embodiment this has been solved by the elastic or viscoelastic glue comprises at least two components, and is prepared by mixing of the components; monitoring and/or control of the mixing for determining if a correct desired mixing product has been achieved; and thereafter application of the layer of the correct mixture of the glue on the hull or the sheet. In this way, can a high quality of the glue joint be assured.

For counteracting the phenomenon "printing" which is a visible optical defect which is seen through laminate caused by a mixture of different materials with different densities in one construction, the joints between the sheets ought to be enlarged for later being refilled with putty compound or strips of cellular plastic together with a bonding agent.

According to one embodiment of the present invention the sheet is equipped with grooves on the first side onto which the glue is applied. The sheet can be equipped with grooves in a cross-pattern, which cross-pattern can comprise first set of grooves which are arranged parallel with each other in a direction perpendicular to the first set of grooves. Preferably, the air evacuation holes are placed along and in the grooves. If the sheet is equipped with a cross-pattern of grooves, the air evacuation holes are preferably arranged in the groove crossings and most preferable in all of the groove crossings. The air evacuation holes can be arranged with a conical design in the sheets. Thereby, then preferably the apex end of the cone is arranged to exit at the surface of the first side and the base at the other side. In this way it can be achieved that the glue that enters in the air evacuation holes gets a better hold and the sheet is fixated with greater force against the hull such that it becomes harder to remove the sheet from the hull. For the glue to advance up into the air evacuation holes it must have some degree of floatability and the skilled in the art can thereby try out suitable viscosity of the glue.

According to a preferred embodiment the inside of the cellular plastic, against the glue surface and the hull, displays a smooth surface except for the glue and air evacuation holes that also, according to yet another preferred embodiment can have a conical enlargement against the glue surface and thereby create "glue bosses" with increased adherence between the glue and the cellular plastic. The diameter of the holes and the conical base is adapted in measurement to that the air evacuation in gluing can be performed and that the glue can reach the surface for visual control.

According to a preferred embodiment a cross-patterned net made from for example a fiber glass web possibly with a surface coating on the mesh of for example an elastic or viscoelastic material, which can be expanded or non-expanded, can be integrated in the glue layer between the cellular plastic and the hull, the glue layer being approx. 1-2 mm thick. The cross-pattern net functions as an element of distance and thereby increases the acoustic loss-factor in the hull system and reinforces and fixates the glue layer when adding a thicker layer. When there is demands for a higher acoustic loss-factor in the construction the glue layer ought to be thicker than 1 mm. High acoustic loss-factor can be of interest for military and measurement vessels, for example. The thickness of the net and glue joint thickness is therefore adapted after acoustic demands on the construction.

The surface of the glued-on sheets is designed and/or smoothen to a desired shape with help of some abrasive tool such as a sanding machine.

Cellular plastic or other light-weight material is used as sheets in accordance with the present invention. With cellular plastic or light-weight material a material is referred to having a weight suitably below 300 kg/m$^3$, preferably below 200 kg/m$^3$.

Further preferred features, advantages and preferred embodiments according to the invention is clear from the dependant claims, and in the following description of embodiments.

DESCRIPTION OF THE DRAWINGS

The present invention shall now be described in further detail in embodiments, with reference to the enclosed drawings, without the invention being interpreted limited thereto, in which.

DETAILED DESCRIPTION

Figure 1:
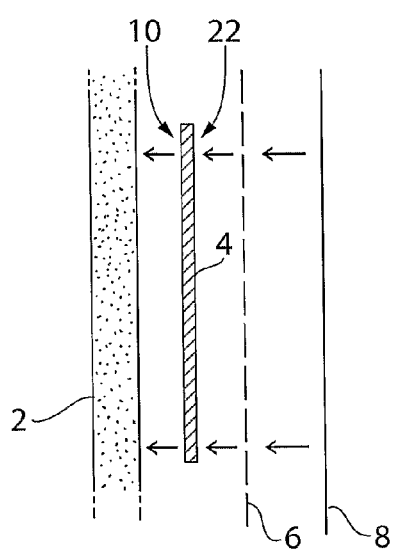
FIG. 1 shows, schematically, in a cross-sectional view from the side, a part of a device and a method step according to an embodiment of the present invention.

The below described method and device indicates the different preferred steps by which the hull system according to the preferred embodiment is mounted on a hull 2, such as an inner hull, preferably made of metal, but could also be made of concrete, plastic or other material adapted for vessels, constructions, containers, tanks or equivalent, according to preferred embodiments. FIG. 1 shows, schematically, the mounting of a sheet of cellular plastic 4 or other light weight material on the hull 2, using a wire 6, or equivalent air permeable material, and a vacuum foil 8. In the following detailed description of embodiments the word cellular plastic or cellular plastic sheet is used even if it, within the scope of the invention also relates to other light weight materials. The expression "sheet" according to the present description is to be understood as sheet shaped means such as a sheet with two parallel opposite sides which extends in an extension plane and which have an insignificant extension in a plane perpendicular to said extension plane.

Primarily, in the following use and applying of an elastic or viscoelastic glue joint is described. Directly on the inner hull 2, but preferably directly on respective sheet of cellular plastic 4 on a first side 10 facing the hull, is firstly arranged a layer of elastic or viscoelastic glue, preferably with polyurethane base (PU). The mixture can preferably comprise two components 23, 24, preferably polyol and isocyanat. In order to ensure an even quality of this glue joint, which is of utmost importance for the secure function of the hull system during its life span, which can be 30-50 years, it is necessary to continuously be able to control that the desired mix of the components, such as polyol and isocyanat, is the correct one. Both components are being pumped from a drum, respectively, with a preset amount per time unit and is continuously mixed in a mixing head 25. The resulting mixture is applied to the hull, or preferably on the first side 10 of the cellular plastic sheet 4 which shall be brought against the hull 2, and is evened out to an even layer. Experience has however shown that it from time to time occurs that the ideal mixture is disturbed, for example by one of the pumps not functioning correctly, or that the operator does not observe that a component is running empty.

As a solution to the above stated problem, the present invention comprises a warning system, such as a control system and/or a monitoring system, where a control is performed such that the correct mixture of the components has been effected, and/or a control is performed such that the right amount of respective component is added in the mixture and automatically provides an indication with an acoustic or optical signal if an error occurs. Another way of performing the control system is to analyze the mixed product, for example regarding color, viscosity, chemical composition, etc. Another way to enable the monitoring system is to measure the pump flow of the pumped components, respectively.

In order to, in an easy but efficient way immediately discover such quality disturbance in the production it has proven to be a good solution, in accordance with the above mentioned control system according to an embodiment of the present invention, for one of the components, preferably the isocyanat, to add a colorant which makes the desired mixture product have an easily identifiable color tone. Both polyol and isocyanat is otherwise naturally colorless/slightly yellow. The glue is preferably applied to the sheet of cellular plastic 4. Both components are liquid before the mixing, to be easy to pump. In mixing, the viscosity can be increased with an amine additive in the base which provides a chemical thixotropy when the components meet in a static mixer. After mixing, the glue transcends to a paste which does not flow and to a color tone that indicates according to a color scale that the mixing is correct.

In accordance with the above mentioned monitoring system, according to an embodiment of the present invention, it is possible to measure and monitor the pump flow for the respective components in mixing. The monitoring system can be arranged to automatically provide a signal, such as an optical or acoustic signal, or to abort the pumping, if a disturbance of the pump flow occurs.

Figure 2A:
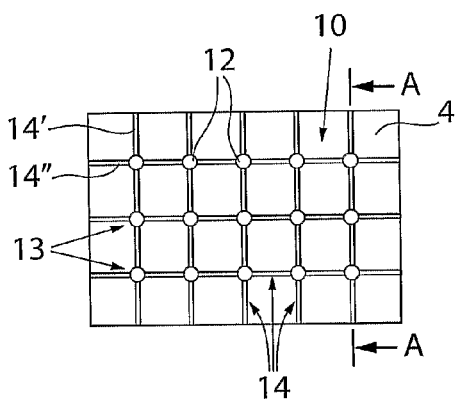
FIG. 2A shows a principle figure of an embodiment of a sheet of cellular plastic or other light-weight material according to an embodiment of the present invention.
Figure 2B:
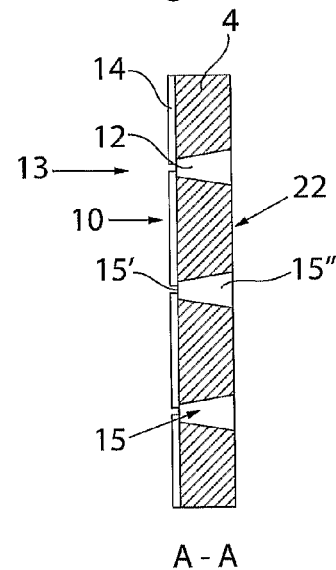
FIG. 2B shows a principle figure of the sheet according to the cross-section A-A of FIG. 2A.

Secondly, in the following, the use and placing of a sheet of cellular material or similar light weight material is described. The cellular material has a most preferred volume weight between 50-150 kg/m$^3$ and has closed cells. It is positioned in form of sheets 4 in suitable size, for example 1000×1500 mm, on the first applied elastic or viscoelastic glue joint, or more preferably the glue is applied firstly on the sheets of cellular plastic according to a preferred embodiment. The thickness of the cellular plastic sheets 4 is normally around 30 mm, but can be both thicker and thinner depending on the need of shape or function, usually within the interval 10-50 mm. To be able to press the sheets 4 with applied glue to the hull 2, or alternatively against the glue surface on the hull 2 with great force and to be able to ensure good quality of the glue joint through visual control of that the glue is evenly distributed between the joint surfaces, the sheets 4 are equipped with through-going air evacuation holes 12 and preferably also grooves 12 on the side which is applied against the glue, such that the sheets can be sucked fixed with vacuum against the glue surface. See FIGS. 2A-2B. The grooves can be around 3 mm deep and 1.5 mm wide.

An example of a standard sheet 10 in another dimension is 2175×1220 mm. Volume weight, on some exposed places, can be up to 400 kg/m$^3$, and down to 15 kg/m$^3$ on some exposed and less exposed places. The grooves 14 can make up a cross-pattern and preferably be 2×2 mm and with through-going air evacuation holes 12, at a distance apart from each other along and inside of the grooves. In accordance with one embodiment the air evacuation holes are arranged in the groove crossings 13 of the cross-pattern, with a suitable dimension of around 2 mm in diameter. In the through-going air evacuation holes 12, the air can exit to the other side 22 of the sheet with the possibly occurring excess glue. Preferably the made cross-pattern of grooves 14 create a first set of grooves 14' which are arranged parallel to the each other, and a second set of grooves 14" which are arranged parallel to the each other, and in a direction perpendicular to the first set of grooves. When the sheets are equipped with a cross-pattern of grooves 14, the air evacuation holes 12 are preferably arranged in all of the groove crosses 13.

Figure 6:
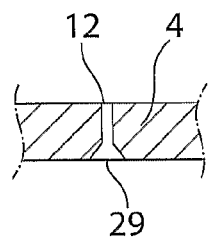
FIG. 6 shows a principle figure of conical holes in the sheet.

According to a preferred embodiment the inside of the cellular plastic 4 displays, against the glue surface and the hull, a smooth surface except for the air and glue evacuation holes 12 that also according to a preferred embodiment can have a conical enlargement 29 towards the glue surface and thereby create "glue bosses" with increased adherence between glue and cellular plastic. The diameter of the holes 12 and the conical base is adapted in measures so that air evacuation in gluing can take place and that the glue can reach the surface for visual control, see FIG. 6.

Figure 7:
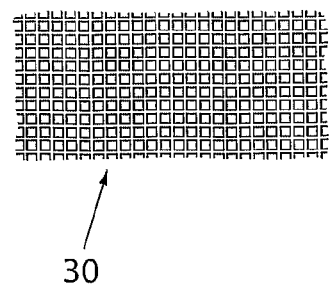
FIG. 7 shows a principle figure of a net which can be integrated in the glue joint.

According to a preferred embodiment a cross-patterned net 30 made from for example fiber glass web, possibly with a surface coating on the mesh of for example an elastic or viscoelastic material which can be expanded or non-expanded, is integrated in the glue layer between the cellular plastic and the hull, the glue layer being around 1-2 mm thick, see FIG. 7. The cross patterned net 30 functions as an element of distance and thereby increases the acoustic loss-factor in the hull system and reinforces and fixates the glue layer when applying a thicker layer. When there are demands for a higher acoustic loss-factor in the construction the glue layer ought to be thicker than 1 mm. High acoustic loss-factor can be of interest for military and measurement vessels, for example. The net 30 and glue joint thickness is therefore adapted after acoustic demands on the construction.

The air evacuation holes can be arranged with a conical design 15 in the sheets 4. Thereby is preferably the apex 15' in the cone arranged to exit at the surface of the first side 10 and the base 15" in the cone at the other side 22. In such a way it can be achieved that the glue that enters the air evacuation holes 12 gets a better grip and the sheet is fixated with a larger force against the hull, such that it is harder to remove the sheet from the hull. To enable the glue to enter the air evacuation holes, it must have some floatability and the skilled in the art can thereby try out a suitable viscosity of the glue.

Figure 3A:
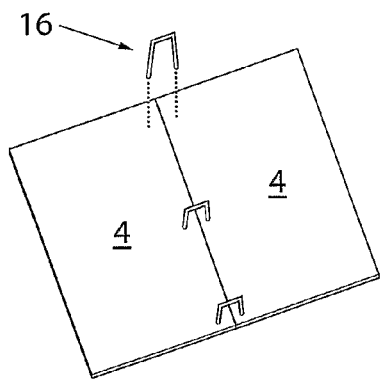
FIG. 3A shows, schematically, in a perspective view at an angle from above, a part of a device and a method step for mounting of sheets according to an embodiment of the present invention.
Figure 3B:
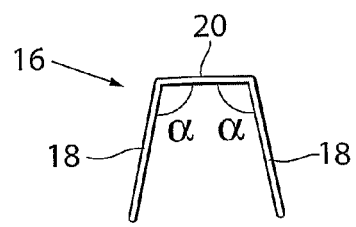
FIG. 3B shows, in a principle figure, a U-shaped staple according to an embodiment of the present invention.
Figure 4:
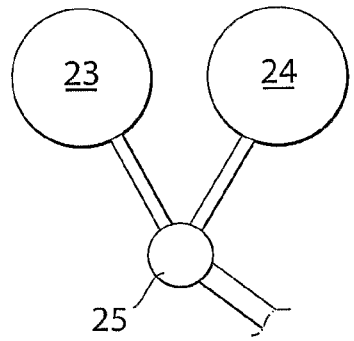
FIG. 4 shows a principle figure of the mixture of at least two components of a glue.
Figure 5A:
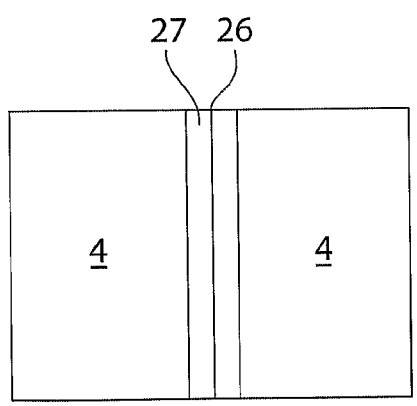
FIG. 5A shows an example of an embodiment of an enlarged joint in a plan view.
Figure 5B:
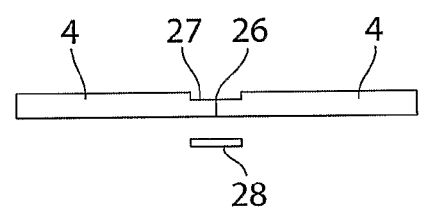
FIG. 5B shows the enlarged joint in a cross-sectional view.

Thirdly, in the following, use and placing of a fastening element is described according to a preferred embodiment of the present invention. The sheets of cellular plastic 4 are hooked to each other for not separating in the mounting. The fastening element can be in the shape of a U-staple, also known as a staple 16, as is obvious from FIG. 3A-B, in mounting of the cellular plastic sheets 10 on the hull 2. For fixation of the sheets 4 next to each other without spacing, fastening elements are used, such as staplers 16 having the shape of a U, which are pressed into two next to each other laying sheets 4. The staple 16 has a small angle α in both legs 18 to guarantee locking. The angle α is an obtuse angle between the back 20 and respective leg 18, i.e. more than 90°. It can for example be 35 mm over the back 20 and made from hardened steel and coated with PTFE (polytetrafluoroethylene). The staplers 16 are removed after the sheets 4 have been glued on.

The fastening element or stapler 16 has the function to hold the cellular plastic sheets together in the joints during the vacuum gluing. Depending on the legs 18 somewhat out-angled shape the sheets 4 pressed together in the edges when the vacuum foil creates a pressure over the back 20 of the staple which in insertion and before the vacuum suction is not entirely pressed-in this function works better if the staple 16 is made from a flat material and the vacuum foil thereby gets better pressure over the back of the stapler. The staplers have an advantage if treated with a bonded release agent, such as PTFE (polytetrafluoroethylene), such that after possibly occurring in-mixing with the glue, they should be easily removed and re-used.

Fourthly a use and assembly of a net, a web, a wire 6 or another air permeable material (see FIG. 1) outside of the sheets of cellular plastic is described (in the following, only the expression "wire" is being used). The wire 6 is preferably made from a loose glass web, which preferably is PTFE coated, with a small mesh and flat profile, 0.7 mm high. It serves as a vacuum distributing net for better air distribution under the vacuum foil 8 (or also known as adhesive foil) which is brought on thereafter. The wire 6 is coated with PTFE for hindering glue that penetrates through the holes 12 in the cellular plastic sheets at the vacuum suction from getting stuck in the wire 6 and making the removal harder. The wire 6 is reused.

The wire 6 is being used against the outer surface of the cellular material i.e. the other side of the sheet 4, for creating an air passage at the contacting of the vacuum and such that the glue can exit up through the holes 12 in the sheet 4, for the purpose of controlling that enough glue has been used and that the air has been removed. The wire 6, which suitably is made from fiberglass is coated with a bonded release agent, such as suitably PTFE. The thickness of the wire 6 can be 0.9 mm. The mesh openings of the wire can be 4×4 mm and the open area 75%. The wire 6 is held in place by previously presented staplers, which are pressed through the mesh of the web before the vacuum foil 8 is applied.

Fifthly, it is described with reference to FIG. 1 in the following the use and assembly of a vacuum foil 8, suitably self-adhesive and preferably with the adhesive outwards on the roll (so called reversed rolling). Preferably the entire surface on the side to be arranged against the sheet is self-adhesive, since it can be hard beforehand to determine where the adhesion of the foil against the sheet is needed. Then it is an advantage if the foil is adhesive all over, to ensure that the no air slips underneath the foil in the vacuum suction. This foil 8 is preferably of thick construction foil type, 0.9 mm thick (can also suitably be between 0.5 and 0.15 mm). The foil 8 has thereby preferably the adhesive outwards for it to be able to be rolled off and at the same time adhere against the sheet of cellular plastic 4, with the wire 6, preferably of PTFE coated fiberglass, there between. The foil 8 has suitably no release agent on its second side for not risking that the releasing agent contaminates the adhesive which thereby can be transferred to the cellular plastic resulting in reduced adherence later on when for example fiberglass polyester is being applied, which is the last step of the hull system, which is the surface coating of the cellular plastic sheets with a material which constitutes the final surface of a finished construction, such as polyester, vinylester or epoxy. The adhesive is so adjusted that it releases from the rear side with a suitable de-rolling resistance. The foil 8 is made of polyethylene (PE), which has a suitable thickness and elasticity for being able to stretch over edges and corners and do not form any leakage folding at the vacuum suction. When the strings of glue exits from the air evacuation holes these are visible as glue spots underneath the vacuum foil, which is transparent.

The roll-weight for the foil is preferably 15 kg (can also be between 10-30 kg per roll). The width is preferably around 1.5 m and the area around 30 m$^2$ per roll. The roll has a center case in which a pipe is placed for de-rolling at the assembly. Two persons are working simultaneously with the placing of the vacuum foil 8.

The vacuum foil 8 which is used can have a tape adhesive tried out for the method, which do not leave adhesive remains behind, or any type of release agent which can come loose and risk causing upcoming lamination problems for the adherence of putty compound and varnish. It is of utmost importance that the vacuum does not decreases during the hardening of the glue when the cellular material 4 is pressed-in against the hull surface which normally is not entirely flat.

Sixthly it is described in the following the use of at least one vacuum suction cup, at the carrying out of the method according to the present invention. A multiplicity of vacuum suction cups are placed evenly distributed over the area on which the sheets of cellular plastic shall be vacuum sucked, such that sufficient vacuum suction can be achieved over respective "vacuum area" where a respective vacuum suction cup is placed, at the connection to a vacuum pump.

Seventhly the use of a vacuum tank is described in the following, at the carrying out of method according to the present invention, for rapid suctions. A vacuum tank with many connections (suitably 8-10), for hoses adapted to be connected to the vacuum suction cup, is provided. The capacity is suitably 0-0.8 kg of negative pressure in the tank. A tank of 200 liters provides a fast enough air-rush.

One part of the cellular material 4 can if needed be thermally shaped in advance in a for the task designed oven/heat box. The cellular material 4 then gets approximately the shape of the hull on to which it shall be applied, but the vacuum will do the rest of the forming.

After the step of the vacuum suction has been performed, the vacuum suction cups and foil is suitably removed, which is easily removed by being pulled away with a small yank. Underlying air permeable materials such as a wire, which serves as a vacuum distributing net, for achieving a good venting, is also removed if it does not come off with the removal of the foil. Thereafter, if used, the fasting elements used in the method are also removed. The wire and the fastening elements are preferably reused.

In order to assure the quality of the joints 26, reinforce the joints and minimize the risk of the earlier mentioned problem with "printing", the joints 26 are enlarged. For example, the joints can be excavated or a rectangular groove 26 be milled along the joints. The enlarged joints are then filled with for example putty compound or strips of cellular plastic 28 together with a bonding agent. The latter fits particularly well in the milled-out rectangular joints, even if strips of cellular plastic also can be conical and be brought into enlarged joints with conical cross-sections. For the excavated joints, filling with putty compound is most suitable. The bonding agent being used together with the strips of cellular plastic can for example be of the same type that is used for gluing of the of the sheets 4.

If the hull is very uneven it is possible to start the mounting of the sheets of cellular plastic 4 with small thickness against the hull 2, for example around 10 mm, and/or low volume weight. Thereafter, the first layer with sheets of cellular plastic can be sanded to a relatively smooth surface without essential uneven portions, or substantially fewer uneven portions, before a following new second layer with sheets of cellular plastic 4 is brought on to the first layer. By this method of vacuum gluing cellular plastic in one or multiple layers onto a usually uneven surface of a hull, a large freedom for designing the hull can be achieved. The outermost layer of cellular plastic can for example be profiled, be made smooth, bulging or double curved, in accordance with requirements, using some sort of abrasive tool, such as a sanding machine.

Furthermore EP-B1-0473587 is incorporated by reference for a completing statement of details in the hereby described different method steps and technical features in accordance with the state of the art.

The invention claimed is:

1. A method for manufacturing an improved hull for vessels, containers or equivalents, comprising the following steps:
    preparing an elastic or viscoelastic glue through mixing at least two components,
    monitoring and/or controlling of the mixing for determining if a correct desired mixing product has been achieved,
    applying a layer of the correct mixture of the glue onto the hull or on a first side of a sheet of cellular plastic or other light weight material,
    mounting of at least one sheet onto the hull, the sheet being equipped with a multiplicity of through—going air evacuation holes which exits on the first and second side of the sheet, respectively,
    placing a net, a web, a wire or equivalent air permeable material on top of the other side of the sheet, wherein the air permeable material is coated with a bonded release agent,
    fixing the sheet towards adjacent sheets, wherein at least one fastening element is arranged over a joint between the sheets,
    mounting a vacuum foil onto the other side of the sheet, for achieving a vacuum between the sheet and the hull when gluing by vacuum suction,
    observing visually if the glue exits out of the air evacuation holes or not on the other side of the sheet,
    enlarging the joints between the sheets and refilling with putty compound or strips of cellular plastic together with a bonding agent, and
    shaping/smoothing the surface of the glued on sheets with abrasive tools.

2. The method according to claim 1, wherein one of the components comprises a colorant at the preparation of the elastic or viscoelastic glue, and where the identification of a color tone of the mixed glue is performed, such that it can be determined from the color tone if a correct desired mixing product has been achieved.

3. The method according to claim 1, wherein mixing of the components, the viscosity is increased by an amine additive in the base which provides chemical thixotropy when the components meet in a static mixer.

4. The method according to claim 1, wherein the fastening element is in the form of a PTFE coated staple made from hardened steel, where the legs of the U-shaped staple is somewhat outward angled in relation to each other, for achieving a contracting effect of the sheets when the staple is pressed in.

5. The method according to claim 1, wherein at least one of the air evacuation holes of a sheet displays a conical enlargement where the base in the cone faces the first side (the glue side) of the sheet.

6. The method according to claim 1, wherein a net is positioned in the glue between the hull and the first surface (the glue side) of the sheet.

7. The method according to claim 1, wherein the sheet is equipped with grooves on the first side onto which the glue is applied.

8. The method according to claim 7, wherein the sheet is equipped with grooves in a cross-pattern, the cross-pattern comprises a first set of grooves which are arranged parallel to each other, and a second set of grooves which are arranged parallel to each other in a direction perpendicular to the first set of grooves.

9. The method according to claim 7, wherein the air evacuation holes are placed along and in the grooves.

10. The method according to claim 8, wherein the air evacuation holes are arranged in the groove crosses formed by the cross-pattern.

11. The method according to claim 1, wherein the air evacuation holes are arranged with a conical design in the sheet, where the apex of the cone is arranged to exit at the surface of the first side of the sheet, and the base to exit at the other side of the sheet.

12. The method according to claim 1, wherein the air permeable material is made from a loose glass web with small mesh.

13. The method according to claim 1, wherein the glue is a viscoelastic glue comprising two components, polyol and isocyanate.

14. The method according to claim 1, wherein the vacuum foil is transparent.

15. The method according to claim 1, wherein the step of: coating the surface with a material which constitutes the final surface of the finished construction.

* * * * *

UNITED STATES PATENT AND TRADEMARK OFFICE
CERTIFICATE OF CORRECTION

PATENT NO.       : 8,388,783 B2                                                     Page 1 of 1
APPLICATION NO.  : 12/918671
DATED            : March 5, 2013
INVENTOR(S)      : Sven Jönsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 421 days.

Signed and Sealed this
First Day of September, 2015

Michelle K. Lee
*Director of the United States Patent and Trademark Office*